United States Patent
Seynaeve et al.

(10) Patent No.: US 12,453,958 B2
(45) Date of Patent: Oct. 28, 2025

(54) METHOD OF REGENERATION OF CARBONACEOUS ADSORBENT

(71) Applicant: Desotec NV, Roeselare (BE)

(72) Inventors: Rikie Seynaeve, Roeselare (BE); Johan Craeye, Izegem (BE)

(73) Assignee: Desotec NV, Roeselare (BE)

( * ) Notice: Subject to any disclaimer, the term of this patent is extended or adjusted under 35 U.S.C. 154(b) by 475 days.

(21) Appl. No.: 17/969,268

(22) Filed: Oct. 19, 2022

(65) Prior Publication Data
US 2024/0131494 A1    Apr. 25, 2024
US 2024/0226852 A9    Jul. 11, 2024

(51) Int. Cl.
*B01J 20/34* (2006.01)
*B01J 20/20* (2006.01)

(52) U.S. Cl.
CPC .......... *B01J 20/3416* (2013.01); *B01J 20/20* (2013.01); *B01J 20/3466* (2013.01); *B01J 20/3483* (2013.01)

(58) Field of Classification Search
None
See application file for complete search history.

(56) References Cited

U.S. PATENT DOCUMENTS

| 1,858,745 A | 5/1932 | Mackert |
| 2,992,895 A | 7/1961 | Feustel et al. |
| 4,008,174 A | 2/1977 | Jacobson et al. |
| 4,587,112 A | 5/1986 | Kim |

FOREIGN PATENT DOCUMENTS

| EP | 0356658 A2 | 3/1990 |
| EP | 2628533 A1 | 8/2013 |
| EP | 3900823 A1 | 10/2021 |
| EP | 3900824 A1 | 10/2021 |
| EP | 3900825 A1 | 10/2021 |

*Primary Examiner* — Colin W. Slifka
(74) *Attorney, Agent, or Firm* — Amster, Rothstein & Ebenstein LLP

(57) ABSTRACT

A method and system are disclosed for regenerating carbonaceous adsorbent, the method comprising the steps of:
  a) providing a carbonaceous adsorbent comprising a catalyst and adsorbed contaminants,
  b) pyrolysing of the adsorbed contaminants,
  c) reactivating the carbonaceous adsorbent by subjecting the carbonaceous adsorbent to steam thereby obtaining a reactivated carbonaceous adsorbent,
  d) cooling the thus obtained reactivated carbonaceous adsorbent to a temperature of less than 250° C. and
  e) oxidizing catalyst that is in a reduced state following steps b) and c) comprised in the reactivated carbonaceous adsorbent.

19 Claims, 1 Drawing Sheet

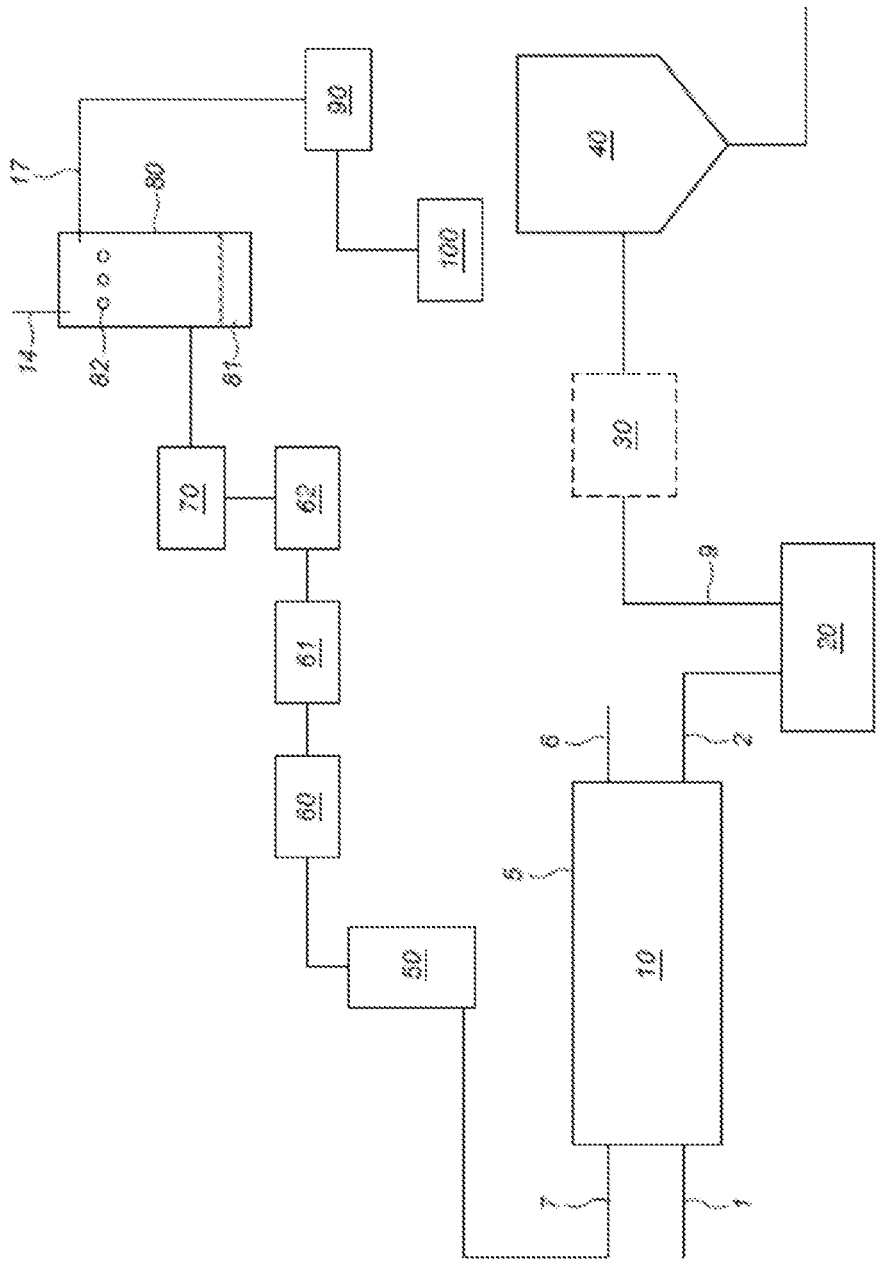

METHOD OF REGENERATION OF CARBONACEOUS ADSORBENT

FIELD OF THE INVENTION

The present invention relates to a method for regenerating carbonaceous adsorbent. In particular, the present invention relates to a method for regenerating carbonaceous adsorbent that has been impregnated with a catalyst, in particular for regenerating catalyst impregnated carbonaceous adsorbent that is contaminated with adsorbed contaminants resulting from the use of the carbonaceous adsorbent in the cleaning of biogases. In a further aspect, the invention relates to a system configured to carry out the method of the present invention.

BACKGROUND

Carbonaceous adsorbents and particularly activated carbon are characterized by their high adsorption capacity for substances from gases and liquids and by their catalytic properties to convert and decompose these substances. They are particularly suitable for adsorbing and removing contaminants from gases and liquids and for decolorizing, deodorizing and purification of wastewater and waste gases.

When the amount of gases or liquids to be treated is relatively small, the carbonaceous adsorbent is typically used to full load (i.e. up to a small remaining adsorption capacity), and the spent or saturated carbonaceous adsorbent is then generally discarded. In large-scale industrial applications and in industrial wastewater treatment, however, it is important from an economical point of view that the large quantities of spent carbonaceous adsorbents are regenerated and re-used.

After all, carbon is a natural product obtained by the destructive distillation at high temperatures of, for example, coking coal, lignite coke or organic material such as peat and coconut shells. The fine carbon powder thus obtained is granulated for better handling and to improve filtration capacity and other physical properties of the carbon. In large-scale industrial applications, the carbonaceous adsorbent is an important cost factor. Methods for the manufacture of activated carbon are frequently described in literature and amongst others in the patent specification U.S. Pat. No. 4,107,084.

There are many known methods for regeneration, i.e. for removing adsorbed substances and reactivating spent carbonaceous adsorbents. Solvent extractions of spent carbonaceous adsorbents, under supercritical conditions or not, are described but the most common methods consist of the removal of excess water, pyrolysis of the dried carbonaceous adsorbent into volatile substances and carbon residues. Most of the methods for the regeneration of spent carbonaceous adsorbents are based on the well-known water/gas reaction in which carbon residues react at high temperatures with water to form carbon monoxide and hydrogen. A typical process for the regeneration of activated carbon is described in the patent specification No. U.S. Pat. No. 4,008,994.

The spent carbonaceous adsorbent is usually heated in the presence of a carrier gas and/or steam to a temperature of from 100° to 900° C. in order to remove adsorbed substances by pyrolysis. The methods for the thermal regeneration of spent carbon-based adsorbents according to the state of the art are, however, not particularly suitable for carbonaceous adsorbent that are impregnated with a catalyst such as for example potassium iodide, magnesium oxide, sodium hydroxide, potassium carbonate, potassium hydroxide, manganese oxide or calcium oxide. Catalyst impregnated carbonaceous adsorbents are used in particular for the cleaning of gas that contains significant amounts of contamination of sulfur compounds such as for example from sulfur-containing sewage gases such as biogas (from anaerobic fermentation), landfill gas and synthetic gas (so-called syn-gas). The catalyst of the carbonaceous adsorbent is typically present to convert $H_2S$ into elemental Sulphur. In this way, a high level of loading of the carbonaceous adsorbent is obtained and thus a longer lifetime of the active carbon filter is achieved.

SUMMARY OF INVENTION

Unfortunately, as a result of the presence of the catalyst in the carbonaceous adsorbent, the carbonaceous adsorbent cannot be readily regenerated in the above described methods of thermal regeneration. Indeed, it has been found that the atmosphere that exists in the furnace used in the thermal regeneration method, is low in oxygen and is a generally reducing atmosphere such that some of the catalyst of the carbonaceous adsorbent may be reduced, for example the metal ion may be reduced at least in part to its elementary form. When such reduced catalyst is again exposed to air, the catalyst may oxidize in an uncontrolled way leading to release of heat and the formation of hotspots in the carbonaceous adsorbent which may result in self-combustion of the adsorbent.

Additionally, typically the catalyst impregnated carbonaceous adsorbent will also be loaded with high amounts of Sulphur when the adsorbent is spent and needs to be regenerated. The amount of Sulphur loading on a spent carbonaceous adsorbent may be as high as 20 to 60% by weight based on the weight of the carbonaceous adsorbent prior to use in removing contaminants. These Sulphur contaminants are converted to $SO_x$ compounds that will be present in the pyrolysis gas that leaves the furnace and which is subsequently burned off in an incinerator. The flue gas containing the $SO_x$ compounds needs to be cleaned so as to remove the $SO_x$ compounds therefrom. However, it has been found that current methods of removing the $SO_x$ compounds from the flue gas are not capable of handling the large amounts of Sulphur loadings to produce a cleaned flue gas that meets regulatory requirements.

Hence, catalyst impregnated carbonaceous adsorbent is typically discarded and burnt whereby not only a valuable amount carbonaceous adsorbent is wasted but also a potential source of Sulphur. It is thus desirable to find a method whereby a catalyst impregnated carbonaceous adsorbent can be regenerated. It is furthermore desirable to find a method that also allows regenerating carbonaceous adsorbent that has high amounts of Sulphur contaminants in an effective and efficient way whereby it is desirable that a valuable product can be made from the waste stream.

In accordance with the present invention there is provided a method for regenerating carbonaceous adsorbent comprising the steps of:
  a) providing a carbonaceous adsorbent comprising a catalyst and adsorbed contaminants,
  b) pyrolysing of the adsorbed contaminants,
  c) reactivating the carbonaceous adsorbent by subjecting the carbonaceous adsorbent to steam thereby obtaining a reactivated carbonaceous adsorbent,
  d) cooling the thus obtained reactivated carbonaceous adsorbent to a temperature of less than 250° C. and e) oxidizing catalyst that is in a reduced state following steps b) and c) comprised in the reactivated carbonaceous adsorbent.

It was found in connection with the present invention that by cooling the reactivated carbonaceous adsorbent to a temperature below 250° C., for example below 100° C. or below 40° C., preferably below 25° C. and more preferably below 20° C. and most preferably below 15° C. combined with controlled oxidizing of catalyst that is in a reduced state, the process can be effectively controlled such that any hotspots are substantially avoided or minimized and self combustion of the carbonaceous adsorbent subsequent to the regeneration and reactivation of the carbonaceous adsorbent can be avoided. Generally, catalyst that is in a reduced state in the regenerated carbonaceous adsorbent may be oxidized in a controlled way, for example by blowing air through the carbonaceous adsorbent. Typically, the linear velocity of the air blowing through the carbonaceous adsorbent should be high enough to cause oxidation of the catalyst as well as sufficient simultaneous cooling of the carbonaceous adsorbent, thus allowing for controlled oxidation without hotspots being generated. A suitable linear velocity will conveniently be at least 0.01 m/s, for example at least 0.10 m/s, preferably between 0.10 and 1.50 m/s, more preferably between 0.10 and 0.60 m/s. The linear velocity may be adjusted through the flow rate of for example a ventilator used for blowing the air through the carbonaceous adsorbent. The linear velocity may conveniently be measured through an anemometer.

The steps of the method may be carried out in the order given but must not necessarily carried out in the given order.

The invention further provides a system configured for carrying out the method, the system comprising a furnace configured for pyrolyzing a carbonaceous adsorbent comprising a catalyst and contaminants, a cooling device connected with an outlet of the furnace and configured for cooling the carbonaceous adsorbent to a temperature of less than 250° C. and a ventilating device connected to the outlet of the cooling device optionally via a sieving device and whereby the ventilating device is configured to oxidize catalyst contained in the carbonaceous adsorbent that is in a reduced state. In a particular embodiment the ventilating device may be comprised of a silo with a ventilator whereby the carbonaceous adsorbent may be guided from the cooling device into a silo to which is connected a ventilator causing the carbonaceous adsorbent to be ventilated in the silo.

The invention further provides the use of a regenerated carbonaceous adsorbent obtained with the method of regenerating carbonaceous adsorbent described herein, for adsorbing one or more contaminants from a gas or liquid, preferably a biogas.

BRIEF DESCRIPTION OF THE DRAWINGS

FIG. 1 shows a schematic drawing of an embodiment of a system configured to carry out the method of the invention.

DETAILED DESCRIPTION

Before the present method, the present use and the present system of the invention are described, it is clarified that the present invention is not limited to specific systems and methods or combinations that are described, since said methods, installations and combinations may of course vary. The terminology that is used herein is not intended as being limiting, since the scope of the present invention is limited exclusively by the appended claims.

As used herein, the singular forms "the" and "a" encompass both the singular and plural references, unless the context clearly indicates otherwise.

The terms "comprising", "comprises" and "consisting of" are, as used herein, synonymous with "inclusive", "including" or "containing", "contains" and are inclusive or open-ended and do not exclude any additional, unstated members, components or steps. The terms "comprising", "comprises" and "consisting of" as used herein are intended to encompass the terms "consisting of" and "consists of".

The statement of numerical ranges with end points comprises all numbers and fractions that fall within said range, as well as the stated end points.

The term "about" or "approximately", as used herein when referring to a measurable value such as a parameter, an amount, a duration and the like, is meant to comprise variations of +/−10% or less, preferably +/−5% or less, more preferably +1-1% or less and even more preferably +/−0.1% or less than the 10 specified value, in so far as such variations are suitable for being made in the invention described.

Although the terms "one or more" or "at least one", such as one or more members or at least one member of a group of members, are clear per se, by way of further explanation the terms comprise among other things a reference to one of said members or to any arbitrary two or more of said members, such as any arbitrary ≥3, ≥4, ≥5, ≥6 or ≥7, etc. of said members, and up to all said members.

All references that are cited in the present description are incorporated hereby by reference in their entirety. In particular, the teaching of all references specifically referred to herein is incorporated by reference.

Unless otherwise defined, all terms that are used when describing the technology, including technical and scientific terms, have the same meaning as is understood by someone with an average knowledge of the field to which this technology belongs. By way of further guidance, the definitions of some terms are included for better understanding of the teaching of the present technology.

Various aspects of the invention are defined in more detail in the following passages. Each aspect that is defined as such may be combined with any other aspect or any other aspects, unless the contrary is clearly stated. In particular, any feature that is indicated as being preferred or advantageous may be combined with any other feature or any other features that are stated to be preferred or advantageous.

Throughout this description, reference to "an embodiment" or "one embodiment" signifies that a specific feature, specific structure or property that is described in connection with the embodiment is incorporated in at least one embodiment of the present invention. Thus, appearances of the phrases "in an embodiment" or "in one embodiment" at different places in this description do not necessarily all refer to the same embodiment, but they might well. Moreover, the specific features, structures or properties may be combined in any suitable way in one or more embodiments, as would be clear to an expert in the field of study from this description. Although particular embodiments that are described herein comprise some features that are not included in other embodiments, but others are not, combinations of features of different embodiments are moreover intended to fall within the scope of the invention, and to form individual embodiments, as would be clear to experts in the field of study. For example, in the appended claims, each of the claimed embodiments may be used in any combination.

The following detailed description should consequently not be construed as being limiting, and the scope of the present invention is defined by the appended claims.

As used herein, the term "carbonaceous adsorbent" refers to a carbon-containing material consisting partially or largely of carbon and that is capable of adsorbing substances in particular contaminants from a gas or liquid. In particular, a carbonaceous material is meant that has undergone a thermal and/or chemical activating process and as a result contains a large number of pores, which dramatically increases the contact surface area of this material relative to unactivated material. This material is characterized by a high adsorption capacity of one or more substances. Accordingly carbonaceous adsorbent is also known and may be referred to herein as "activated carbon", "active carbon", "activated charcoal", "active charcoal" or "Norit". The carbonaceous adsorbent may be in any form as known or used in the art including powder form, granular form, extruded form, bead form, or fibrous form e.g. a woven or non-woven form. Generally, the carbonaceous adsorbent will be in granular form, extruded form or bead form.

In a particular embodiment in connection with the present invention, the carbonaceous adsorbent is impregnated with a catalyst. In a particular embodiment, the catalyst is an inorganic salt, hydroxide or oxide that comprises a metal ion selected from the group consisting of $K^+$, $Na^+$, $Cu^{++}$, $Mn^{++}$, $Mg^{++}$, $Ca^{++}$ and $Fe^{+++}$. In a particular embodiment, the catalyst is selected from NaOH, $Fe(OH)_3$, $K_2CO_3$, KI, $I_2$, KOH, CaO, $Ca(OH)_2$, MgO, CuO and MnO. The amounts of impregnated catalyst may vary widely and are typically between 0.5 and 35.0% by weight, for example between 1.0 and 25.0% by weight or between 3.0 and 15.0% by weight. Typically, the amount of catalyst will be chosen based on the application and type of catalyst. Exemplary embodiments of catalyst impregnated carbonaceous adsorbent include carbonaceous adsorbent impregnated with 1.0 to 30.0% by weight NaOH, 1.0 to 20.0% by weight of $Fe(OH)_3$, 1.0 to 30.0% by weight of $K_2CO_3$, 1.0 to 10.0% by weight KI, 1.0 to 10.0% by weight $I_2$, 1.0 to 20.0% by weight of KOH, 1.0 to 10.0% by weight of CaO, 1.0 to 10.0% by weight of $Ca(OH)_2$, 1.0 to 10.0% by weight of MgO, 1.0 to 10.0% by weight of CuO or 1.0 to 10.0% weight of MnO. Herein the % by weight is expressed relative to the weight of the carbonaceous adsorbent without the impregnated catalyst.

The catalyst impregnated carbonaceous adsorbent is typically used to remove contaminants from a liquid or gas, in particular a gas such as biogas, landfill gas and syn-gas by contacting the gas with the carbonaceous adsorbent for example by guiding the gas through a bed of the carbonaceous adsorbent. The contaminants are thereby adsorbed on the carbonaceous adsorbent. In a particular embodiment, the gas to be cleaned may be brought into contact with the carbonaceous adsorbent once or several times, wherein the carbonaceous adsorbent in loose form is brought into contact with the gas, or in a form wherein the carbonaceous adsorbent is surrounded by gas-permeable packaging or a gas-permeable membrane. Contact between the gas and the carbonaceous adsorbent membrane is characterized by incubation without movement of air, or by contact wherein the gas is led passively or actively at a constant or variable linear velocity through a space that contains the carbonaceous adsorbent. When the maximum loading capacity of the carbonaceous adsorbent is reached, i.e. no further contaminants can be efficiently adsorbed and the carbonaceous adsorbent is saturated, the carbonaceous adsorbent is spent and needs to be regenerated whereby the process according to the invention can be used. Contaminants that may be adsorbed by the carbonaceous adsorbent from the gas include for example mercaptans, sulfides, sulfur, silanes, siloxanes, ammonia and other nitrogen containing organics, halogenated compounds, volatile organic compounds (terpentenes, ketones, alkanes, alkenes, cycloalkanes and aromatic compounds, volatile fatty acids, esters, ethers and alcohols). In particular where the gas is a methane-containing gas such as biogas, landfill gas or syn-gas, the spent carbonaceous adsorbent may contain significant amounts of Sulphur contaminants. Herein Sulphur contaminants refers to any sulfur-containing compound, not being limited to $H_2S$ (hydrogen sulfide) or $SO_2$ (sulfur dioxide). Accordingly, Sulphur contaminants include compounds of the group of sulfides, thiols, disulfides, polysulfides, thioesters, sulfoxides, sulfones, thiosulfinates, sulfimides, sulfoximides, sulfonediimines, S-nitrosothiols, sulfur halides, thioketones, thioaldehydes, thiocarboxylates, thioamides, sulfuric acids, sulfonic acids or sulfuranes.

In a particular embodiment, the loading of the spent carbonaceous adsorbent with Sulphur contaminants may be at least 5.0% by weight, for example at least 15.0% by weight or even at least 20.0% by weight. In a particular embodiment, the loading is between 20.0 and 60.0% by weight. Herein the weight % is expressed as the total weight percentage of sulphur containing contaminants to the dry spent carbonaceous adsorbent. By dry spent carbonaceous adsorbent is meant a carbonaceous adsorbent with adsorbed sulfur-containing and other contaminants that has been dried for at least 4 hours at a temperature of 110° C.

In accordance with the method of the present invention, the spent carbonaceous adsorbent, i.e. the carbonaceous adsorbent comprising a catalyst and adsorbed contaminants, is subjected to a pyrolyzing step and a reactivation step. In the pyrolyzing step at least part of the contaminants are pyrolyzed causing the contaminants to be decomposed and/or desorbed from the carbonaceous adsorbent. Further, the carbonaceous adsorbent is simultaneously or subsequently subjected to steam so as to reactivate the carbonaceous adsorbent. The steps of pyrolyzing and reactivation are typically carried out in a furnace. The furnace for the regeneration of the spent carbonaceous adsorbents according to this invention can be a fluidized bed, a rotary kiln, a multiple stage furnace, or a shaft furnace such as those frequently described in the state of the art for example as disclosed in U.S. Pat. Nos. 4,3471,56 and 5,913,677. Most furnaces include a drying and a regeneration zone in which the spent carbonaceous adsorbent is dried and regenerated by means of pyrolysis with release of pyrolysis gases and volatile substances.

Spent carbonaceous adsorbent is fed at a constant flow rate to the furnace and dried at a temperature of from 40° C. to 300° C. (preferably at a temperature of from 90° C. to 130° C.) and propelled mechanically and by means of discharged steam through the furnace where the carbonaceous adsorbent is regenerated and pyrolysis gases and other volatile substances are released under pyrolysis conditions, at temperatures of from 300° C. to 900° C. (preferably at temperatures of 350° C. to 700° C.) and preferably with addition of steam causing carbon residues to decompose into CO and $H_2$.

In a preferred embodiment in connection with the present invention, air is blown through the carbonaceous adsorbent comprising a catalyst and adsorbed contaminants thereby cooling and oxidizing catalyst that is in a reduced state and/or any other components on the carbonaceous adsorbent that may be in a reduced state. Typically, the linear velocity of the air blowing through the carbonaceous adsorbent should be high enough to cause oxidation of the catalyst and/or other components in a reduced state as well as simultaneous cooling of the carbonaceous adsorbent. A suitable linear velocity will conveniently be at least 0.01 m/s, for example at least 0.10 m/s, preferably between 0.10 and 1.50 m/s, more preferably between 0.10 and 0.60 m/s. Preferably, subsequent to this treatment the carbonaceous adsorbent comprising a catalyst and adsorbed contaminants is immersed in and/or impregnated with water. This step may be carried out prior to commencing the method of regenerating the carbonaceous adsorbent. It has been found that where the carbonaceous adsorbent has been used to clean a gas or liquid in a process where conditions exist that are reducing in nature or that are low in oxygen content, the catalyst present on the carbonaceous adsorbent may be at least partially reduced as well as contain contaminants that are in a reduced state and can be oxidized when brought in contact with air. To mitigate any possibility that such reduced catalyst and components in a reduced state may oxidize in an uncontrolled way when brought in contact with air while the carbonaceous adsorbent is being transported, stored and/or manipulated prior to being brought into the furnace, it has been found beneficial to cause a controlled oxidation thereof with air as described above. Accordingly, self-combustion and hotspot building prior to the furnace may thereby be avoided.

Upon leaving the furnace, the reactivated carbonaceous adsorbent should be cooled to a temperature less than 250° C., for example less than 100° C., such as less than 40° C., preferably below 25° C. and more preferably below 20° C. and most preferably below 15° C. When leaving the furnace, the carbonaceous adsorbent will typically have a temperature of between 500° C. and 1000° C., generally between 600° C. and 900° C. To avoid any hotspots to form or build, cooling of the carbonaceous adsorbent is preferably carried out quickly to the target temperature. Cooling may be effected by quenching or through the use of a heat exchanger. In the case of cooling through quenching, the cooling medium may be selected from water, steam, air or an inert gas such as for example nitrogen or carbon dioxide and any of the known quenching devices may be used such as for example a fluid bed, a cooling tower, a walking floor, a water bath or a shaking belt through which the cooling medium is blown. In a preferred embodiment, a heat exchanger is used to cool the carbonaceous adsorbent whereby the carbonaceous adsorbent and the cooling medium are separated from each other. The media that may be used in the heat exchanger include air or water including ice water. The heat exchanger may include one, two or more screws that whirl the carbonaceous adsorbent and advance it. Alternatively the heat exchanger may include a rotating spiral or may be a rotary drum.

Additionally, the carbonaceous adsorbent is subjected to air to cause oxidation of catalyst that is in a reduced state. Typically, air will be blown through the carbonaceous adsorbent at a linear velocity high enough to cause oxidation of the catalyst as well as simultaneous cooling of the carbonaceous adsorbent, thus allowing for controlled oxidation without hotspots being generated. A suitable linear velocity will conveniently be at least 0.01 m/s, for example at least 0.10 m/s, preferably between 0.10 and 1.50 m/s, more preferably between 0.10 and 0.60 m/s. Generally, as a result of the oxygen poor atmosphere in at least parts of the furnace, some amount of catalyst may have been reduced and uncontrolled oxidation thereof has been found to be a cause of hotspots and spontaneous combustion of the carbonaceous adsorbent. Controlled oxidation of catalyst in a reduced state may be effected by blowing air through the carbonaceous adsorbent in one or more ventilation stages through which the carbonaceous adsorbent may be guided.

Further, in accordance with a particular embodiment, the carbonaceous adsorbent may be sieved to obtain carbonaceous adsorbent with the desired particle size and distribution. This sieving step, when implemented, may precede the step of blowing air through the regenerated carbonaceous adsorbent or may be subsequent thereto.

In accordance with a particular embodiment, the reactivated carbonaceous adsorbent may be immersed in and/or impregnated with water subsequent to the oxidation step. Additionally or alternatively, the reactivated carbonaceous adsorbent may be impregnated with an inert gas such $CO_2$ or nitrogen. This will have the advantage that any hotspot building during storage and in particular during startup in a process of removing contaminants from a liquid or gas can be minimized. In particular, it has been found that the impregnation with water or an inert gas slows down the initial take up contaminants such that a more even take up of the contaminants by the carbonaceous adsorbent results which aids in avoiding local buildup of heat in the carbonaceous adsorbent which may in some case also cause self-combustion.

In addition to the stream of regenerated and re-activated carbonaceous adsorbent, the method of the present invention also creates a stream of pyrolysis gas. This pyrolysis gas may also contain $SO_x$ compounds and in particular $SO_2$. This is in particular so when the carbonaceous adsorbent is loaded with Sulphur contaminants, such as when the carbonaceous adsorbent has been used to clean methane-containing gas such as biogas and landfill gas which may contain considerable amounts of Sulphur contaminants.

In accordance with an embodiment of the invention, the pyrolysis gases that contain $SO_2$ are burned off in an incinerator whereby flue gases are obtained that will be containing $SO_2$. The flue gas is then cooled and dust is removed therefrom. Cooling of the flue gas may be accomplished through the use of an evaporative cooler, a heat exchanger, an economizer or any combination thereof. In a particular embodiment, the flue gas may be cooled in a heat exchanger operated with water, followed by an economizer and subsequently further cooled in one or more evaporative coolers. As a result the flue gas will be cooled to a temperature of less than 200° C., preferably less than 100° C. and typically to a temperature of about 70° C. As a result of the use of an evaporative cooler, $SO_3$ that is typically also contained in the flue gas can be removed as $H_2SO_4$.

Removal of dust from flue gas is well known and any of the commercial methods of separating dust from the flue gases can be used including those of the mechanical type as well as of an electrostatic type. Examples of dust removal by the mechanical type include those, by means of a multi-cyclone or wet scrubbers. Electrostatic types, include an electrostatic precipitator or a Cottrell electrical dust collector, positioned at opposite inner sides of the flue and employing direct current at high voltages ranging from 25,000 to 100,000 volts so as to charge and collect the fine particles simultaneously, the particles deposited on the charging plates are then scrubbed or rapped to a waste treating vessel. In a preferred embodiment in connection with the present invention, a wet electrostatic precipitator is used, for example such as commercially available from Hugo Petersen GmbH, Wiesbaden, Germany or Scheuch GmbH, Aurolzmünster, Austria.

According to an embodiment of the invention, following the dust removal from the flue gas, $SO_2$ contained in the flue gases is reacted with calcium hydroxide and/or calcium carbonate thereby producing calcium sulphite and optionally also some calcium sulphate. Conveniently, such reaction is carried out through a washing tower or a scrubber whereby a slurry or suspension of calcium hydroxide and/or calcium carbonate is used to wash the flue gas. The aqueous liquid from the washing tower or scrubber will contain calcium sulphite and optionally some calcium sulphate and this liquid may be sent to an oxidation tank where it is stirred and purged with air causing oxidation of calcium sulphite to calcium sulphate. Following dewatering of the liquid, preferably to a maximum of 10.0% by weight of water, hydrated calcium sulphate can be obtained that can be used in the production of gypsum products such as wall-boards. In this connection, it was found that removal of dust from the flue gas is desirable to obtain a quality and purity of calcium sulphate sufficient for commercial use. Accordingly, this embodiment provides the advantage that on the one hand, despite a possible high loading of Sulphur contaminants in the spent carbonaceous adsorbent, $SO_x$ compounds can be effectively removed therefrom meeting regulatory requirements and furthermore, the resulting product is a valuable product stream.

The method for regenerating carbonaceous adsorbent comprising a catalyst and adsorbed contaminants as described above in the various embodiments, may be carried out in a system that is schematically depicted in FIG. 1. FIG. 1 shows a furnace 10 with an inlet 1 for input of a spent carbonaceous adsorbent. Furnace 10 further has an inlet 6 for burning gas and an outlet 7 where the pyrolysis gas leaves the furnace. Further shown is an inlet 5 for supply of steam into the furnace. Carbonaceous adsorbent enters the furnace via inlet 1 and moves through the furnace in opposite direction to the hot burnt gas which enters the furnace from the opposite direction via inlet 6. Furnace 10 is preferably a rotary kiln or a multiple hearth furnace and conveniently has a drying zone, a decomposition zone and a reactivation zone (not shown). Pyrolysis will predominantly take place in the decomposition zone but may also take place in the drying zone and reactivation zone. Burnt gas enters furnace 10 typically with a temperature of at least 900° C. and leaves as pyrolysis gas at a temperature of about 500° C. via outlet 7. Within the furnace 10, the drying zone will be located at the inlet side of the carbonaceous adsorbent and the reactivation zone may be located at the side where the carbonaceous adsorbent leaves the furnace 10 with the decomposition zone being located between both zones. Steam will be supplied via inlet 5 to the reactivation zone.

Following exit from the furnace 10 via outlet 2, the reactivated carbonaceous adsorbent is sent to a cooler 20 for cooling the reactivated carbonaceous adsorbent to a temperature of less than 250° C., for example less than 100° C. or less than 40° C., preferably below 25° C. and more preferably below 20° C. and most preferably below 15° C. Cooler 20 may be any of the cooling devices mentioned earlier and may include a cooling tower or may be a heat exchanger including one or more screws that is cooled with a cooling liquid such as water or ice water and that advances the carbonaceous adsorbent in the system towards the devices in the system that are arranged after the cooler. It is preferred in the method of the present invention that the carbonaceous adsorbent is cooled relatively quickly, preferably within a period of 0.5 to 15 minutes, for example 1 to 5 minutes.

Through output 9 of cooler 20, the carbonaceous adsorbent in a particular embodiment may be sieved in sieving device 30 from where the carbonaceous adsorbent is brought into one or more silos 40 equipped with a ventilator to blow air through the carbonaceous adsorbent in the silo to oxidize any catalyst of the carbonaceous adsorbent that may be in a reduced state. Blowing air through the carbonaceous adsorbent in one or more silos 40 enables controlled oxidization of any reduced catalyst whereby the air supplies oxygen for the oxidation and simultaneously cools the carbonaceous adsorbent thus arranging for a controlled oxidation. As discussed before, the air linear velocity will conveniently be at least 0.01 m/s, for example at least 0.10 m/s, preferably between 0.10 and 1.50 m/s, more preferably between 0.10 and 0.60 m/s. Any carbon dust that may be formed in silos 40 is captured by an appropriate filter. Finally, when leaving the silos 40, the carbonaceous adsorbent can be packaged and stored and can subsequently be re-used in cleaning of gases or liquids to remove contaminants therefrom.

In a particular embodiment in connection with the present invention, the system for regenerating carbonaceous adsorbent also includes devices for cleaning and processing of the pyrolysis gas that leaves furnace 10 via outlet 7. As shown in FIG. 1, the pyrolysis gas is guided to an incinerator 50 where the pyrolysis gas is burnt. The resulting flue gas leaves incinerator 50 and is guided to cooling devices 60, 61 and 62. In the particular embodiment illustrated in FIG. 1, cooling device 60 is a heat exchanger operated with water, cooling device 61 is an economizer and cooling device 62 is an evaporative cooler. Although FIG. 1 illustrates a particular arrangement of cooling device, it is clear that any arrangement of cooling devices may be used that is suitable to cool the flue gas to a desired temperature as described above. Cooled flue gas is then guided to dust remover 70 which preferably is a wet electrostatic precipitator but which may also be a mechanical dust remover. The flue gas from which dust has been removed is then brought into scrubber 80 that comprises a milky slurry 81 of calcium hydroxide and/or calcium carbonate. As shown, the flue gas is passed from the bottom of the scrubber that includes sprayers 82 spraying the milky slurry 81. Above sprayers 82 are positioned demystifiers and droplet catchers. Cleaned flue gas leaves the scrubber via outlet 14 and the aqueous solution containing the reaction products (calcium sulphite and possibly calcium sulphate) of reacting $SO_2$ contained in the flue gas with the calcium hydroxide and/or calcium carbonate leaves via outlet 17 and is passed into oxidation tank 90 where the liquid is stirred and purged with air to cause oxidation of the calcium sulphite. The resulting liquid is then dewatered in dewatering device 100.

The invention claimed is:

1. A method for regenerating carbonaceous adsorbent comprising the steps of:
    a) providing a carbonaceous adsorbent comprising a catalyst and adsorbed contaminants,
    b) pyrolysing of the adsorbed contaminants,
    c) reactivating the carbonaceous adsorbent by subjecting the carbonaceous adsorbent to steam thereby obtaining a reactivated carbonaceous adsorbent,
    d) cooling the thus obtained reactivated carbonaceous adsorbent to a temperature of less than 250° C. and
    e) oxidizing catalyst that is in a reduced state following steps b) and c) comprised in the reactivated carbonaceous adsorbent.

2. The method according to claim 1, wherein the catalyst is an inorganic salt, hydroxide or oxide that comprises a metal ion selected from the group consisting of K+, Na+, Cu++, Mn++, Mg++, Ca++ and Fe+++.

3. The method according to claim 1, wherein step e) is carried out by blowing air through the reactivated carbonaceous adsorbent whereby the linear velocity of air is at least 0.01 m/s.

4. The method according to claim 1, wherein the carbonaceous adsorbent comprising a catalyst and adsorbed contaminants is obtainable by impregnating activated carbonaceous adsorbent with 1.0 to 30.0% by weight NaOH, 1.0 to 20.0% by weight of $Fe(OH)_3$, 1.0 to 30.0% by weight of $K_2CO_3$, 1.0 to 10.0% by weight KI, 1.0 to 10.0% by weight $I_2$, 1.0 to 20.0% by weight of KOH, 1.0 to 10.0% by weight of CaO, 1.0 to 10.0% by weight of $Ca(OH)_2$, 1.0 to 10.0% by weight of MgO, 1.0 to 10.0% by weight of CuO or 1.0 to 10.0% weight of MnO and exposing the impregnated activated carbonaceous adsorbent to gaseous stream comprising contaminants.

5. The method according to claim 1, wherein prior to step of pyrolyzing and reactivating, air is blown through the carbonaceous adsorbent comprising a catalyst and adsorbed contaminants thereby cooling the carbonaceous adsorbent and oxidizing catalyst and/or contaminants that may be in a reduced state.

6. The method according to claim 1 further comprising the step of impregnating the carbonaceous adsorbent with water and/or an inert gas before or after reactivation.

7. The method according to claim 1, wherein the reactivated carbonaceous adsorbent is cooled to a temperature of less than 100° C.

8. The method according to claim 1, wherein the contaminants comprise Sulphur and wherein pyrolysis gases resulting from step b) are burned off in an incinerator thereby obtaining flue gases containing $SO_2$, the method further comprising the steps of cooling the flue gases, removing dust from the flue gases and reacting $SO_2$ contained in the flue gases with calcium hydroxide and/or calcium carbonate thereby producing calcium sulphite.

9. The method according to claim 8, wherein the method further comprises the step of step of oxidizing the calcium sulphite to calcium sulphate.

10. The method according to claim 9, wherein the reaction of $SO_2$ contained in the flue gases with calcium hydroxide and/or calcium carbonate is carried out by washing the flue gases with a suspension of calcium hydroxide and/or calcium carbonate in water thereby producing an aqueous slurry comprising calcium sulphite and calcium sulphate and wherein the method further comprises the step of dewatering the aqueous slurry to obtain hydrated calcium sulphate.

11. The method according to claim 1, wherein step e) is carried out by blowing air through the reactivated carbonaceous adsorbent whereby the linear velocity of air is between 0.1 and 1.50 m/s.

12. The method according to claim 1, wherein the reactivated carbonaceous adsorbent is cooled to a temperature of less than 40° C.

13. The method according to claim 1, wherein the reactivated carbonaceous adsorbent is cooled to a temperature of less than 25° C.

14. The method according to claim 1, wherein the reactivated carbonaceous adsorbent is cooled to a temperature of less than 15° C.

15. A system configured for carrying out the method of claim 1 comprising a furnace configured for pyrolyzing a carbonaceous adsorbent comprising a catalyst and contaminants, a cooling device connected with an outlet of the furnace and configured for cooling the carbonaceous adsorbent to a temperature of less than 40° C. and a ventilating device connected to the outlet of the cooling device optionally via a sieving device and whereby the ventilating device is configured to oxidize catalyst contained in the carbonaceous adsorbent that is in a reduced state.

16. The system according to claim 15 further comprising an incinerator connected to the furnace and configured to burn pyrolysis gases from the furnace so as to produce flue gas, one or more cooling devices configured to cool the flue gas connected to the incinerator and connected to a dust remover configured for removing dust from the flue gas and whereby the dust remover is connected to a scrubber configured for reacting $SO_2$ that may be contained in the flue gas with calcium hydroxide and/or calcium carbonate.

17. The system according to claim 16, wherein the system further comprises an oxidation tank connected with an outlet of the scrubber and further optionally a dewatering device configured to receive the liquid of an oxidation tank.

18. A method for adsorbing one or more contaminants from a gas or liquid, said method comprising contacting the gas or liquid with a regenerated carbonaceous adsorbent obtained with the method of claim 1.

19. A method for adsorbing one or more contaminants from a biogas, said method comprising contacting the biogas with a regenerated carbonaceous adsorbent obtained with the method of claim 1.

* * * * *